United States Patent [19]
Cheng

[11] Patent Number: 6,089,125
[45] Date of Patent: Jul. 18, 2000

[54] COMBINATION WIRE STRIPPER

[76] Inventor: Yin-Ho Cheng, No. 1, Alley 78, Lane 379, Chunghua Rd., Shulin Town, Taipei County, Taiwan

[21] Appl. No.: 09/383,438

[22] Filed: Aug. 27, 1999

[51] Int. Cl.⁷ ..................................................... H02G 1/12
[52] U.S. Cl. ............................................................ 81/9.44
[58] Field of Search ........................... 81/9.4, 9.44, 9.43, 81/9.42, 9.41; 30/91.1, 91.2, 90.1, 90.6

[56] References Cited

U.S. PATENT DOCUMENTS

| | | | |
|---|---|---|---|
| 4,108,028 | 8/1978 | Perrino | 81/9.5 B |
| 4,799,406 | 1/1989 | Diaz-De-Guerenu-Aguirrebeitia | 81/9.4 |
| 4,829,671 | 5/1989 | Cheng | 30/90.1 |
| 5,009,006 | 4/1991 | Sawyer et al. | 30/90.6 |
| 5,150,522 | 9/1992 | Gwo-Jiang | 30/91.2 |
| 5,829,322 | 11/1998 | Chen | 81/9.44 |

*Primary Examiner*—Timothy V. Eley
*Assistant Examiner*—Dung Van Nguyen
*Attorney, Agent, or Firm*—Rosenberg, Klein & Lee

[57] ABSTRACT

A combination wire stripper, which includes two pressure bars each having a fixed end pivoted to each other and a free end, two wire stripping cutter assemblies symmetrically provided at the free ends of the pressure bars for stripping the insulator of a two-line electric wire, and an elongated cutter blade fastened to one pressure bar and moved to act V-notches at the other pressure bar for stripping the insulator of electric wires of different diameters, the wire stripping cutter assemblies each having two symmetrical pairs of movable wire clamping plates respectively supported on a respective spring element, and forced by the respective spring element for holding down a two-line electric wire in position for stripping positively.

2 Claims, 5 Drawing Sheets

COMBINATION WIRE STRIPPER

BACKGROUND OF THE INVENTION

The present invention relates to a wire stripper, and more particularly to a combination wire stripper, which is practical for stripping the insulator of any of a variety of electric wires including single-line electric wires and two-line electric wires, without damaging the conductor(s).

When stripping the insulator of an electric wire, a wire stripper may be used. FIG. 7 shows a conventional wire stripper and crimper multipurpose tool. This multipurpose tool 3 comprises blades 31 pivoted together, and two jaws 32 respectively formed integral with the blades 31 at one end for acting against each other to strip the insulator of an electric wire 33. When the jaws 32 are squeezed toward each other against the electric wire 33, the insulator of the electric wire 33 is cut by the cutting edge at each jaw 32, and then the multipurpose tool 3 is pulled outwards from the electric wire 33, enabling the cut piece of insulator to be removed from the electric wire 33. However, when pulling the multipurpose tool 3 outwards from the electric wire 33, as shown in FIG. 8, the blades 31 tend to be biased, causing the conductor of the electric wire 33 to be damaged.

SUMMARY OF THE INVENTION

The present invention has been accomplished to provide a combination wire strippers, which eliminates the aforesaid problem. It is one object of the present invention to provide a combination wire strippers, which keeps the electric wire maintained perpendicular to the cutter blades, enabling the insulator of the electric wire to be positively stripped. It is another object of the present invention to provide a combination wire strippers, which is practical for stripping the insulator of any of a variety of electric wires without causing a damage to the conductor. According to the present invention, two symmetrical pairs of movable wire clamping plates are supported on a respective spring element, and forced by the respective spring element to hold down an electric wire in position for stripping positively.

DETAILED DESCRIPTION OF THE PREFERRED EMBODIMENT

Figure 1:
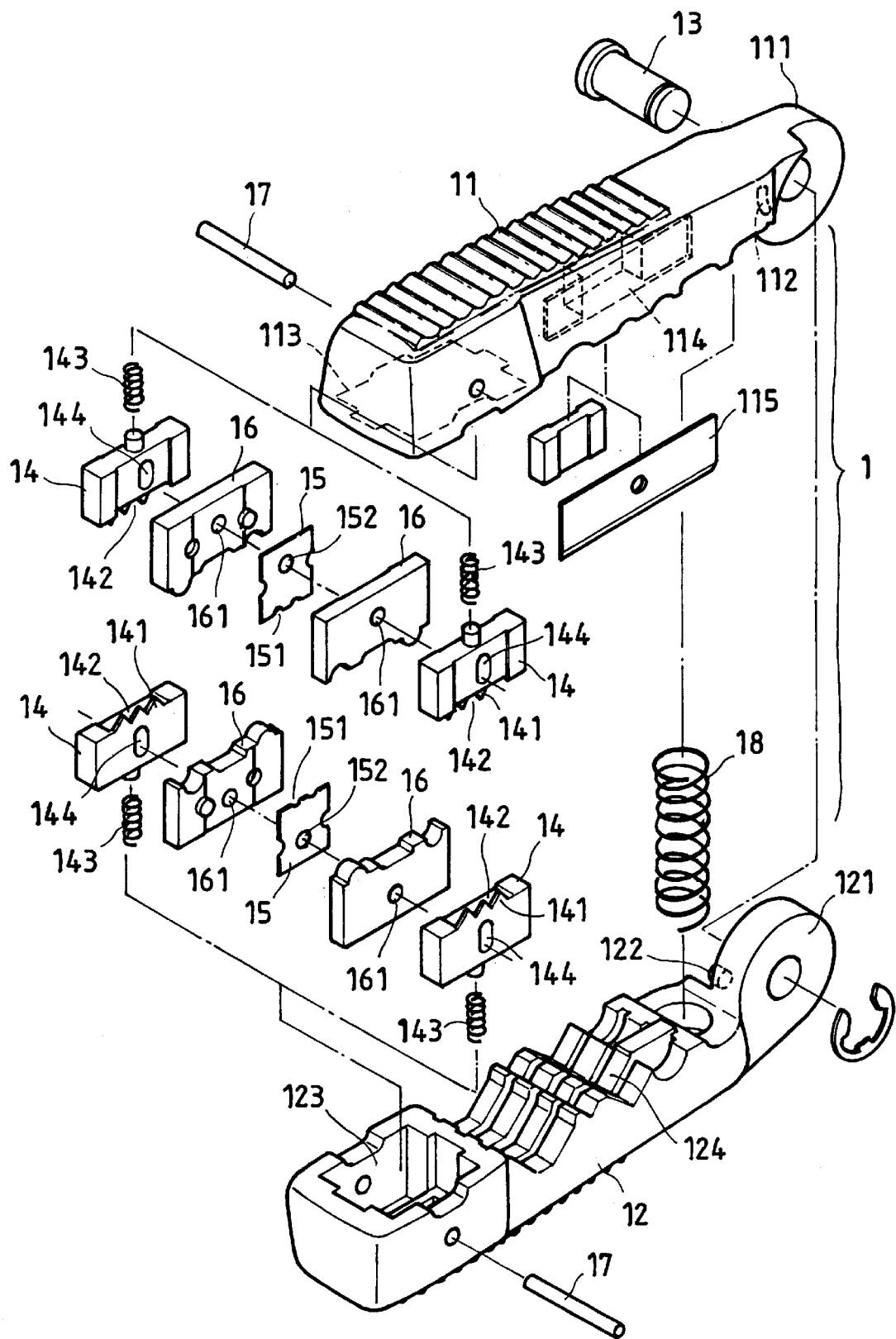
FIG. 1 in exploded view of a combination wire stripper according to the present invention.
Figure 2:
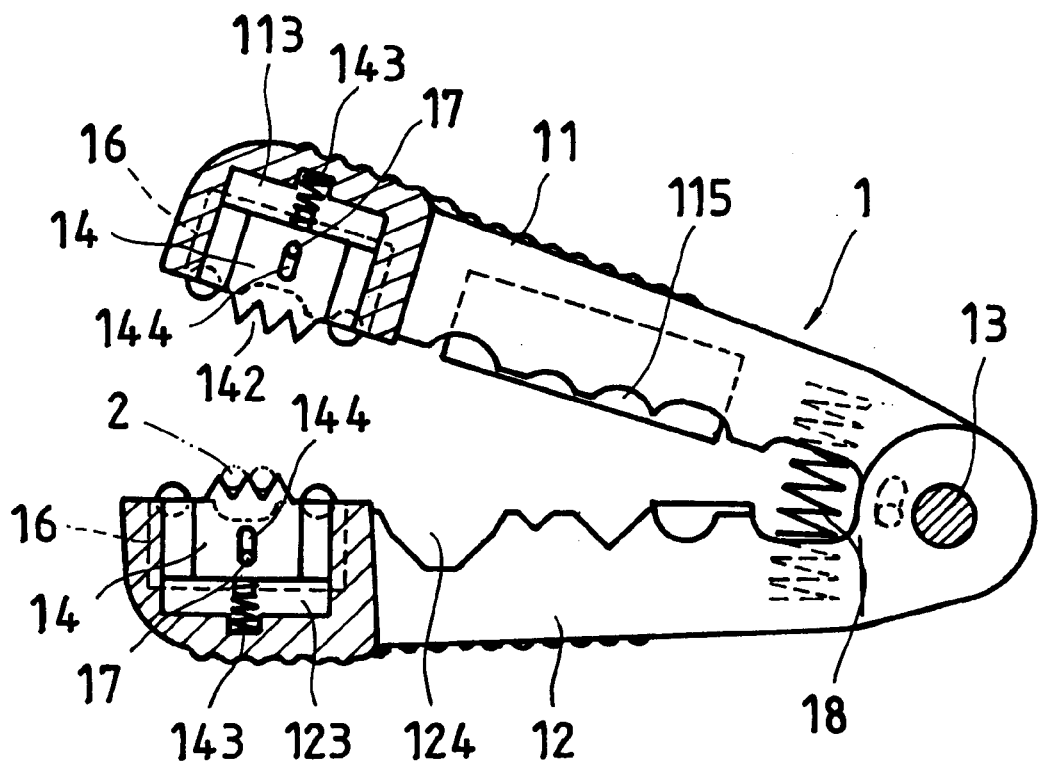
FIG. 2 is a sectional assembly view of the combination wire stripper shown in FIG. 1.
Figure 3:
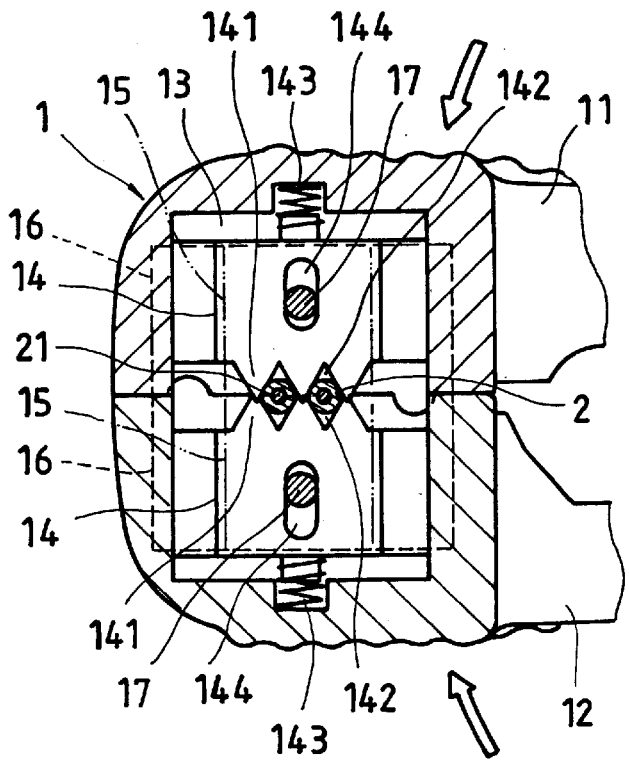
FIG. 3 is a sectional view of a part of the present invention, showing the first pressure bar and the second pressure bar closed.
Figure 4:
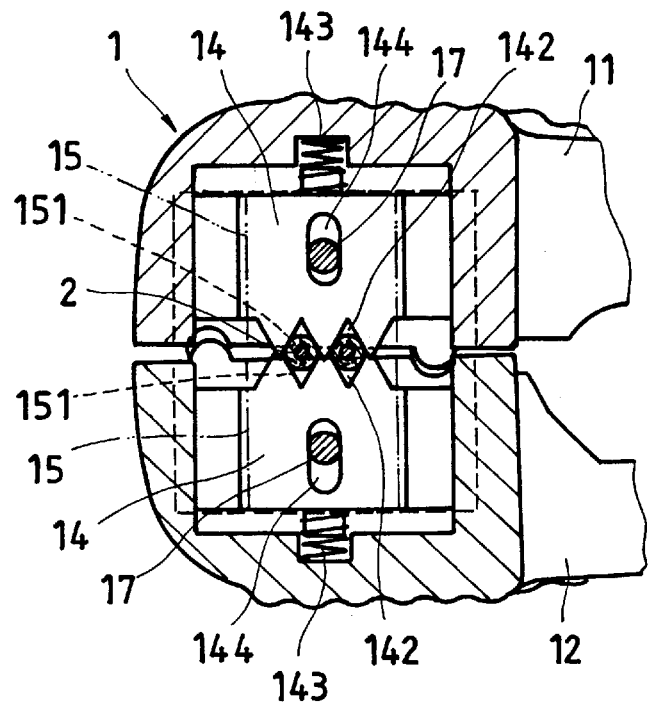
FIG. 4 is similar to FIG. 3 but showing the cutter blades disengaged from the conductors of the two-line electric wire, the wire clamping plates clamped on the two-line electric wire.
Figures 5, 6:
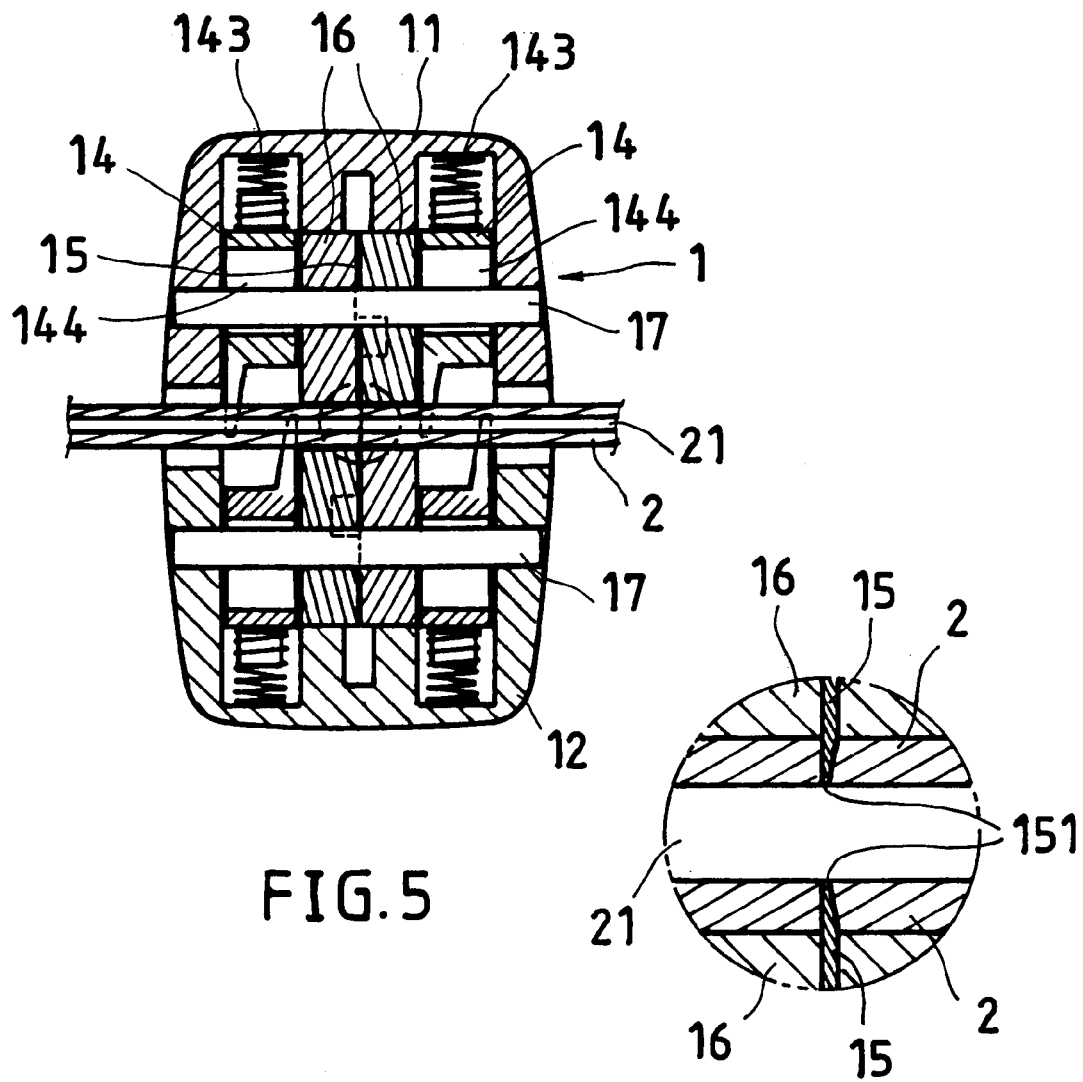
FIG. 5 is a cross sectional view of the present invention, showing the first pressure bar and the second pressure bar closed, the cutter blades cut in the insulator of a two-line electric wire.
FIG. 6 is an enlarged view of a part of FIG. 5.
Figure 7:
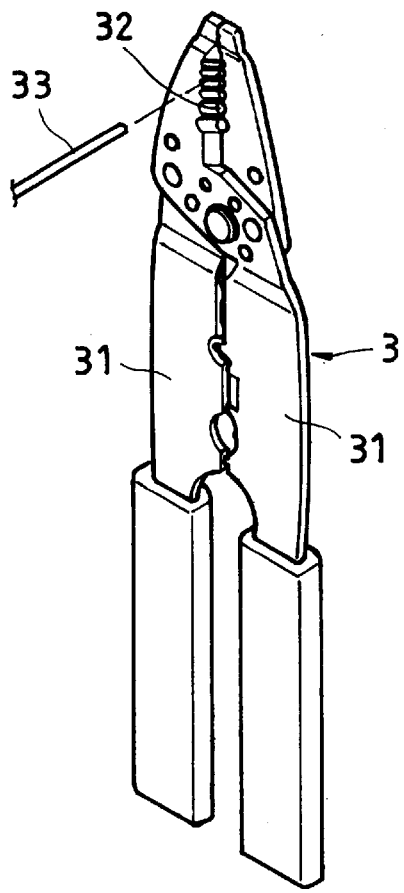
FIG. 7 illustrates a wire stripper and crimper multipurpose tool according to the prior art.
Figure 8:
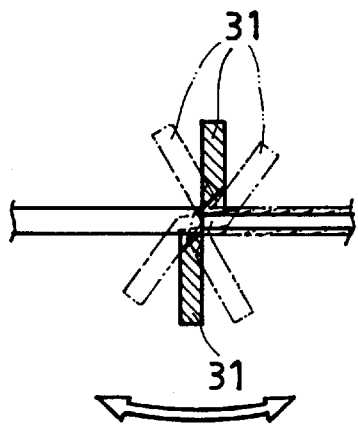
FIG. 8 is a schematic drawing showing the jaws of the prior art wire stripper and crimper multipurpose tool biased.

Referring to FIGS. from 1 through 6, a combination wire stripper 1 is shown comprised of a first pressure bar 11 and a second pressure bar 12. The first pressure bar 11 and the second pressure bar 12 each have a coupling portion 111;121 at one end, and an open chamber 113;123 at an opposite end. The coupling portions 111 and 121 of the pressure bars 11 and 12 are pivotably connected together by a pivot 13. A spring 18 is connected between the pressure bars 11 and 12 to push the pressure bars 11 and 12 apart. The first pressure bar 11 comprises a smoothly arched guide slot 112 near its coupling portion 111. The second pressure bar 12 comprises a guide rod 122 raised from one side wall thereof near its coupling portion 121, and inserted into the arched guide slot 112 at the first pressure bar 11 to limit the turning angle of the pressure bars 11 and 12 relative to each other. In the open chamber 113 or 123 at one pressure bar 11 or 12, there are provided a cutter blade 15, two wire clamping plates 14 retained at two opposite sides of the cutter blade 15, and two flat blade jaws 16 bilaterally retained between the cutter blade 15 and the wire clamping plates 14. The wire clamping plates 14 are supported on a respective spring element 143 in the open chamber 113 or 123. The spring element 143 imparts an outward pressure to the respective wire clamping plate 14. A pin 17 is inserted through an elongated slot 144 at each of the clamping plates 14, a locating hole 161 at each of the flat blade jaws 16 and a locating hole 152 at the cutter blade 15 to fixedly secure the cutter blade 15, the wire clamping plates 14 and flat blade jaws 16 to the inside of the open chamber 113 or 123. The cutter blade 15 has a notched cutting edge 151 for cutting the insulator of a two-line wire. The clamping plates 14 each have a working side wall 141, and a serrated portion 142 formed integral with the working side wall 141 for holding down a two-line electric wire 2. The first pressure bar 11 further comprises a narrow, elongated slot 114 at its inner side wall, and a cutter blade 115 fixedly mounted in the narrow, elongated slot 114. The second pressure bar 212 further comprises a plurality of V-notches 124 spaced between the open chamber 123 and the coupling portion 121 corresponding to the cutter blade 115 for stripping the insulator of single-line electric wires of different diameters. When a two-line electric wire 2 is put in between the cutter blades 15 at the pressure bars 11 and 12, the pressure bars 11 and 12 are squeezed against each other, causing the notches cutting edge 151 of each cutter blade 15 to cut into the insulator of the two-line electric wire 2. Before removing the cut piece of insulator from the two-line electric wire 2, the pressure bars 11 and 12 are slightly loosened from each other, enabling the two-line electric wire 2 to be retained between the wire clamping plates 14 and the cutter blades 15 to be spaced from the conductors 21 of the two-line electric wire 2. Therefore, removing the cut piece of insulator from the two-line electric wire 2 does not causes the conductors 21 of the two-line electric wire 2 to be damaged by the notched cutting edge 151 of each cutter blade 15.

While only one embodiment of the present invention has been shown and described, it will be understood that various modifications and changes could be made thereunto without departing from the spirit and scope of the invention disclosed.

What the invention claimed is:

1. A combination wire stripper comprising:

a first pressure bar, said first pressure bar comprising a coupling portion at a rear end thereof, a downward open chamber at a front end thereof, a narrow, elongated cutter blade slot longitudinally disposed on the middle between the downward open chamber and coupling portion at said first pressure bar, and an arched guide slot near the coupling portion at said first pressure bar;

a second pressure bar, said second pressure bar comprising a coupling portion at a rear end thereof pivoted to the coupling portion of said first pressure bar, an upward open chamber at a front end thereof facing the downward open chamber at said first pressure bar, a plurality of V-notches disposed on the middle between the upward open chamber and coupling portion at said second pressure bar, and a guide rod raised from one side wall thereof and inserted into the arched guide slot at said first pressure bar to guide relative movement between said first pressure bar and said second pressure bar;

two wire stripping cutter assemblies respectively mounted in the downward open chamber at said first pressure bar and the upward open chamber at said second pressure bar for stripping the insulator of a two-line electric wire, said wire stripping cutter assemblies each comprising a fixed locating pin, two fixed blade jaws fixedly mounted on said fixed locating pin, a cutter blade fixedly connected between said fixed blade jaws, two movable wire clamping plates respectively mounted on said fixed locating pin at two opposite sides of said fixed blade jaws, said movable wire clamping plates each having an oblong sliding slot coupled to said fixed locating pin and a serrated portion for holding down a two-line electric wire, and two spring elements respectively supporting said movable wire clamping plates in the open chamber in said first pressure bar or said second pressure bar to push said movable wire clamping plates outwards;

spring means connected between said first pressure bar and said second pressure bar to push said first pressure bar and said second pressure bar outwards from each other; and an elongated cutter blade fixedly mounted in the elongated cutter blade slot and moved with said first pressure bar against the V-notches at said second pressure bar for cutting the insulator of one-line electric wires of different diameters.

2. The combination wire stripper of claim 1 wherein the serrated portion at each of the movable wire clamping plates of one of said wire stripping cutter assemblies and the serrated portion at each of the movable wire clamping plates of the other of said wire stripping cutter assemblies are alternatively arranged in different lines.

* * * * *